United States Patent
Chang

[19]

[11] Patent Number: 6,138,520
[45] Date of Patent: Oct. 31, 2000

[54] DETECTING DEVICE CAPABLE OF MEASURING SPEED AND TORQUE SIMULTANEOUSLY

[76] Inventor: Hsin-Zong Chang, No. 9, Her Ping Lane, Hsiu Hsui Hsiang, Chang Hua Hsien, Taiwan

[21] Appl. No.: 09/019,083

[22] Filed: Feb. 5, 1998

[30] Foreign Application Priority Data

May 21, 1997 [TW] Taiwan ................................. 86208481

[51] Int. Cl.$^7$ ...................................................... G01L 3/02
[52] U.S. Cl. ...................... 73/862.193; 343/891; 343/753
[58] Field of Search .......................... 73/862.195, 862.31, 73/862.23, 862.24, 862.328, 862.193; 343/891, 753

*Primary Examiner*—Hezron Williams
*Assistant Examiner*—Jewel V. Thompson
*Attorney, Agent, or Firm*—Dougherty & Troxell

[57] ABSTRACT

A detecting device is disclosed capable of measuring the rotational speed and torque simultaneously and in which the dynamic loss is reduced to the lowest level. The detecting device has a main disk, a pair of sub-detecting disks, a spring socket, a spring member, a sensor, and a display. The main disk is provided with a shaft hole centrally and with a circular recess around the shaft hole. The circular recess is further extended with a plurality of lobe grooves, each lobe groove having an adjusting groove in which an adjusting bolt is moveably disposed. An outer sub-detecting plate is fixedly attached to the main disk forming an output end, and an inner sub-detecting plate is fixedly attached t a spring socket. Teeth portions of the inner and outer sub-detecting plates are initially aligned with each other, but when the spring member is rotated a certain angle, an offset difference will be established between the inner and outer sub-detecting disks. A sensor measures the proportional ratio between the inner and outer sub-detecting disks. Accordingly, the rotational speed and the torque value can be therefore measured.

4 Claims, 8 Drawing Sheets

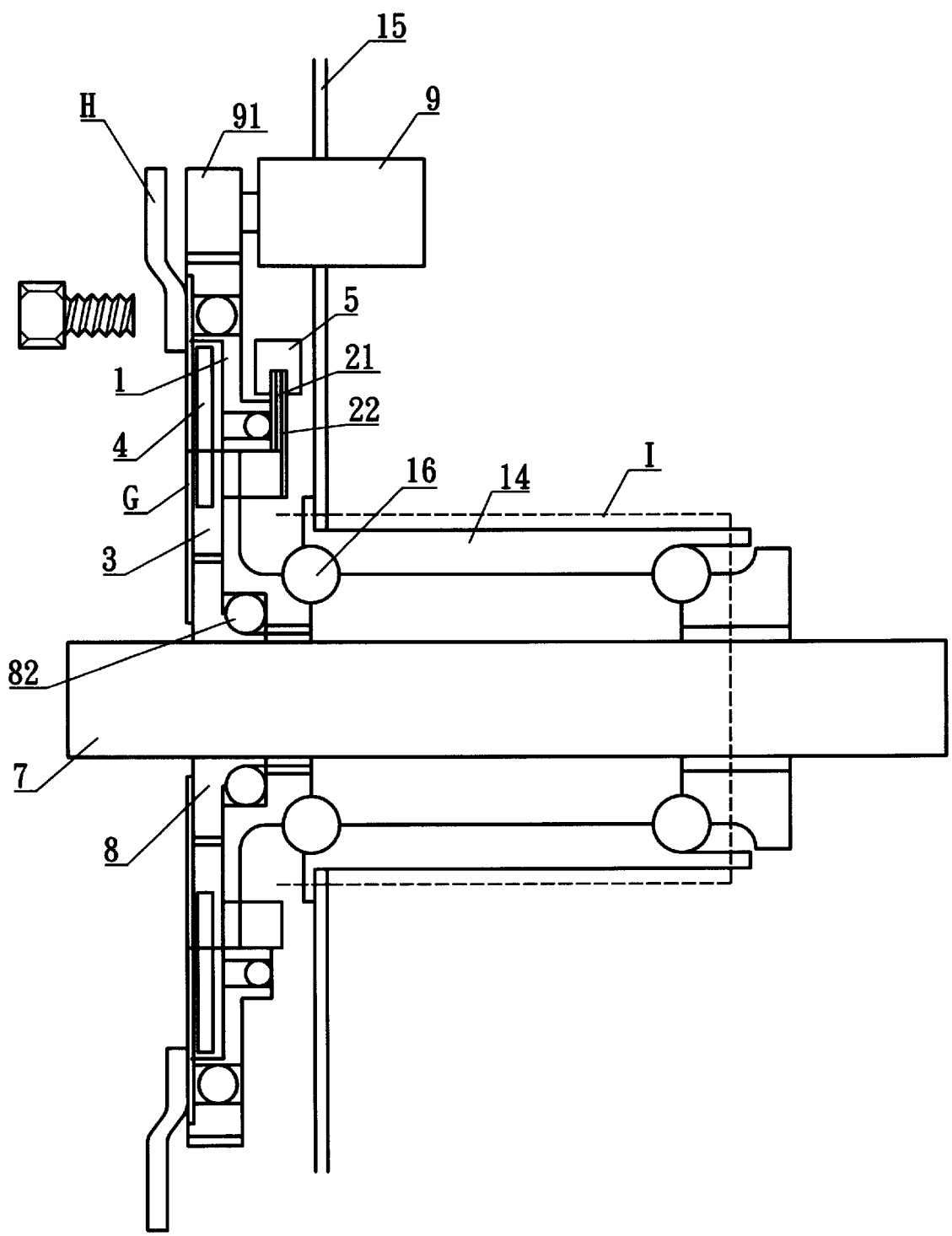
FIG5-A

DETECTING DEVICE CAPABLE OF MEASURING SPEED AND TORQUE SIMULTANEOUSLY

FIELD OF THE INVENTION

The present invention relates to a detecting device, more particularly, to a detecting device capable of measuring the rotational speed and torque simultaneously and wherein the dynamic loss can be reduced to the lowest level. The detecting device capable of measuring the rotational speed and torque simultaneously of the types that comprises a main disk, a pair of sub-detecting disks, a spring socket, a spring member, a sensor, and a display. The main disk has a given thickness and is provided with a shaft hole centrally. The main disk is further provided with a circular recess around the shaft hole. The circular recess is further extended with a plurality of lobe grooves from the periphery of the circular recess. Each of the lobe grooves is further provided with an adjusting groove in which an adjusting bolt is moveably disposed therein. Then the outer sub-detecting plate of the sub-detecting plate is fixedly attached to the main disk and an output end is formed accordingly. The other detecting is fixedly attached to a spring socket that is provided with a shaft hole at the center. The spring socket includes a plurality of elongate grooves that are equiangularly arranged. The spring socket is also provided with a shaft hole. Each of the elongate grooves is mounted with a spring member therein and part of the spring member extends beyond the spring socket. The other end of the spring member extends beyond the spring socket. The spring socket and the spring member are jointly disposed within the circular recess of the main disk in a manner such that the projected spring is biased against to the adjusting bolt within the adjusting groove. An input end is formed accordingly. Then a shaft is inserted to assemble those elements and that serves the power input. After those elements are assembled by means of a shaft, the spring member may serve as a medium for force transmission. The sensor is disposed above the top surface of those inner and outer sub-detecting disks. The sensor is electrically connected with the display. When the external force is introduced through the shaft, the inner sub-detecting disk is rotated accordingly. The teeth portion of the inner and outer sub-detecting disks are aligned with each other, but not locked up with each other. When the spring member is rotated to a certain angle, an offset difference will be established between the inner and outer sub-detecting disks. When the resilient force resulted from the deformation of the spring member is larger than the load, the input end and the output end will be rotated simultaneously. When the load is released or equal to zero (0), the input end is resumed to the original relative position. The sensor may measure the proportional ratio between no-pass and pass of those two inner and outer sub-detecting disks. Accordingly, the rotational speed and the torque value can be therefore measured. The rotational speed and the torque values can be readily detected in a dynamic, lower power loss, and noiseless manner.

DESCRIPTION OF PRIOR ART

In the existing rotational mechanism, the input shaft is driven manually or by an electric motor, then the output shaft of the rotational mechanism will in turn drive the other pertinent mechanisms. Most of the rotational mechanism is utilized in industrial production for power transmission. On the other hand, in order to ensure a steady throughput, the rotational mechanism must be kept in a constant status or speed. Accordingly, maintaining a constant speed and torque transmission for the rotational mechanism has become an important issue in this field.

Nevertheless, in the existing rotational mechanism, only the rotational speed can be measured during the rotation of the mechanism. It is difficult to measure the torque while the shaft is rotating. However, the operating torque shall be kept as constant as possible during the operation to ensure an effective production. For example, the rotational mechanism for the paper sheet roller, vehicle, electric bicycle or press shall be kept constantly to ensure the smooth operation. Besides, the rotational speed and the torque may vary during the rotation. For example, in order to prevent the paper sheet from breaking apart during the winding process, the tension of the paper sheet shall be carefully controlled. However, in the prior art, the tension can only be controlled through the rotational speed. If the speed exceeds a limit, the operator can do nothing but stop the driving mechanism. Nevertheless, the overall configuration is bulky and complicated. The controlling manner is also not smooth. As a result, there are a lot of limits on the utilization and it can not be upgraded.

SUMMARY OF THE INVENTION

It is the objective of this invention to provide a detecting device that is capable of measuring the rotational speed as well as the torque during the operation and overall dynamic loss is low and the noise is less.

In order to achieve the objective set forth, a detecting device capable of measuring the rotational speed and torque simultaneously is provided. The detecting device comprises a main disk, a pair of sub-detecting disks, a spring socket, a spring member, a sensor, and a display. The main disk has a given thickness and is provided with a shaft hole centrally. The main disk is further provided with a circular recess around the shaft hole. The circular recess is further extended with a plurality of lobe grooves from the peripheral of the circular recess. Each of the lobe grooves is further provided with an adjusting groove in which an adjusting bolt is moveably disposed therein. Then the outer sub-detecting plate of the sub-detecting plate is fixedly attached to the main disk and an output end is formed accordingly. The other detecting is fixedly attached to a spring socket that is provided with a shaft hole at the center. The spring socket includes a plurality of elongate grooves that are equiangularly arranged. The spring socket is also provided with a shaft hole. Each of the elongate grooves is mounted with a spring member therein and part of the spring member extends beyond the spring socket. The other end of the spring member extends beyond the spring socket. The spring socket and the spring member are jointly disposed within the circular recess of the main disk in a manner such that the projected spring is biased against to the adjusting bolt within the adjusting groove. An input end is formed accordingly. Then a shaft is inserted to assemble those elements and that serves the power input. After those elements are assembled by means of a shaft, the spring member may serve as a medium for force transmission. The sensor is disposed above the top surface of those inner and outer sub-detecting disks. The sensor is electrically connected with the display. When the external force is introduced through the shaft, the inner sub-detecting disk is rotated accordingly. The teeth portion of the inner and outer sub-detecting disks are aligned with each other, but not locked up with each other. When the spring member is rotated to a certain angle, an offset difference will be established between the inner and outer sub-detecting disks. When the resilient force resulted from the deformation of the spring member is larger than the load, the input end and the output end will be rotated simultaneously. When the load is released or equal to zero (0), the input end is resumed to the original relative position. The sensor may measure the proportional ratio between no-pass and pass of those two inner and outer sub-detecting disks. Accordingly, the rotational speed and the torque value can be therefore measured. The rotational speed and the torque values can be readily detected in a dynamic, lower power loss, and noiseless manner.

According to one aspect of the present invention, the spring member is inserted into the elongate groove of the spring socket and the upper portion of the spring is inserted into the cutout of the main disk in a manner such that the upper portion of the spring is biased against with the adjusting bolt of the adjusting groove of the main disk. The adjusting bolt can be moved upward and downward along the adjusting groove to adjust the preset torque values. When the detecting device is rotated, the maximum of forward rotating angle of the spring element is about three (3) degrees. When the spring member is moved back, it is stopped by the cutout of the main disk. Even the angular difference between those two inner and outer sub-detecting disks is quite small, this variation between those two sub-detecting disks can be readily measured by the sensor and the measurement will be further transmitted to the display. This measurement can be displaced by a rectangular wave and corresponding values and that can be readily converted into speed value and torque value. That is another feature of the present invention.

According to another aspect of the present invention, the optical wave measured by the sensor will be transmitted to the display for calculating the proportional rate for converting the rectangular wave and values. When those sub-detecting disks are reset, i.e. the torque is zero (0) when there is no load, the ratio between High/Low will be 50%:50%. If an external force is applied to the shaft, i.e. a load or resistance is applied onto the input end, the outer sub-detecting disk and the inner sub-detecting disk are offset from each other again such that the ratio may become 48%:52%. The higher the torque values, the higher the High/Low ratio. From this ratio, the rotational speed and the torque can be quickly and correctly measured. Accordingly, the rotational speed and torque value can be readily measured under a non-direct contact, dynamic situation. This detecting device also features a low cost, low dynamic loss, noiseless, simple configuration and easy assembling.

According to another aspect of the present invention, the rotational speed and torque values can be readily measured from the sum of the non-pass and pass between the inner and outer sub-detecting disks and the proportional difference rate. When the inner and outer sub-detecting disks are rotated simultaneously, the difference between the high potential interval and lower potential interval and measured by said sensor is the angular value of the distortion of said spring member. The torque value can be readily attained by multiplying the angular value with the rating of said spring member, the torque can be readily determined

BRIEF DESCRIPTION OF DRAWINGS

In order that the present invention may more readily be understood the following description is given, merely by way of example with reference to the accompanying drawings, in which:

FIG. 3 is a schematic illustration showing the elastic member is disposed within the cutout;

FIG. 3A is an enlarged view of area A in FIG. 3.

FIG. 5A is a cross sectional view of the detecting device shown in FIG. 5;

DETAILED DESCRIPTION OF PREFERRED EMBODIMENT

Figure 1:
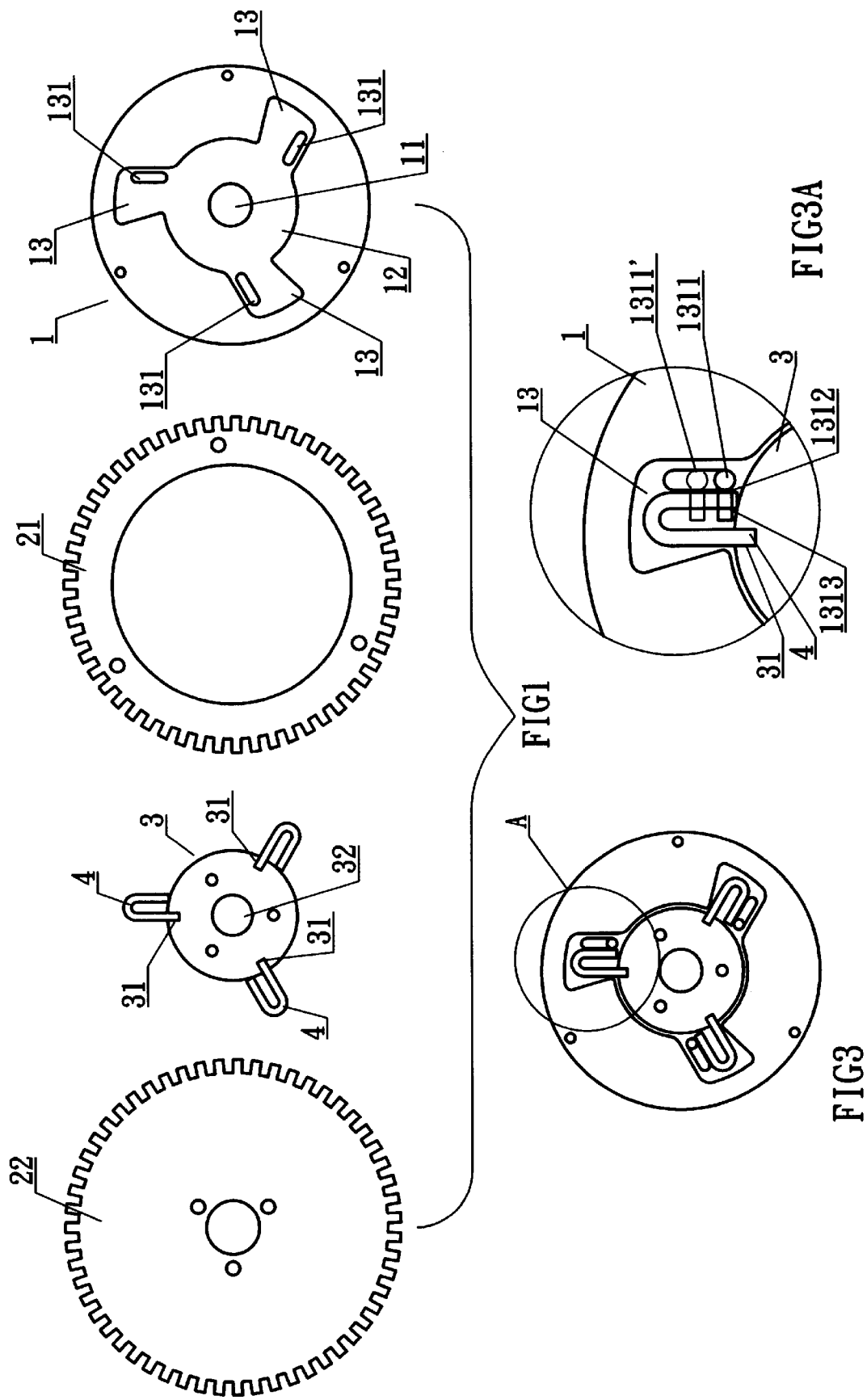
FIG. 1 is an exploded view of the detecting device made according to the present invention.
Figure 2:
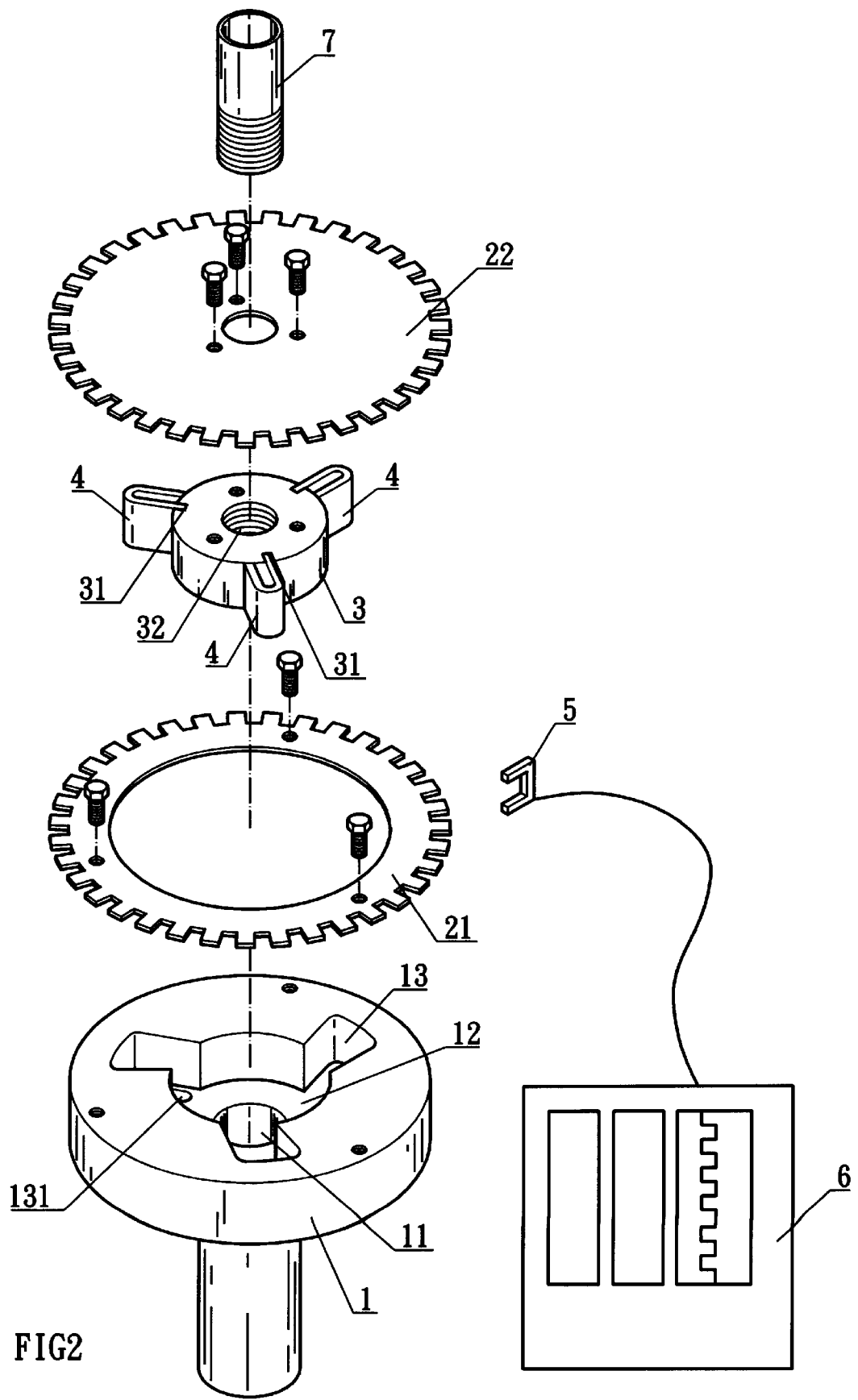
FIG. 2 is an exploded view of the detecting device shown in FIG. 1.

Referring to FIGS. 1 and 2, the detecting device capable of measuring the rotational speed and torque simultaneously comprises a main disk 1, a sub-detecting disk 2, a spring socket 3, a spring member 4, a sensor 5, and a display 6.

The main disk 1 has a given thickness and is provided with a shaft hole 11 centrally. The main disk 1 is further provided with a circular recess 12 around the shaft hole 11. The circular recess 12 is further extended with a plurality of lobe grooves 13 from the periphery of the circular recess 12. In this preferred embodiment, the number of the lobe grooves 13 is three. Each of the lobe grooves 13 is equiangularly arranged. Each of the lobe grooves 13 is further provided with an adjusting groove 131 in which an adjusting bolt 1311 is moveably disposed therein. The adjusting bolt 1311 is fixedly locked onto a limiting tab 1312 that has an opening 1313 for receiving and retaining the spring member 4 thereof. Then the outer detecting plate 21 of the sub-detecting plate 2 is fixedly attached to the main disk 1. As a result, an output end is formed accordingly.

The sub-detecting disk 2 is comprised by an outer detecting disk 21 and an inner detecting disk 22. The perimeters of the outer and inner detecting disks 21, 22 are provided with teeth portions and the inner detecting disk 22 is fixedly attached to a spring socket 3, while the outer detecting disk 21 is fixedly attached to the main disk 1.

The spring socket 3 includes a plurality of elongate grooves 31 that are equiangularly arranged. In this preferred embodiment, the number of the elongate grooves 31 is three. The spring socket 3 is also provided with a shaft hole 32. Each of the elongate grooves 31 is mounted with a spring member 4 therein and part of the spring member 4 extends beyond the spring socket 3.

The spring member 4 is made from resilient material and is inserted into the elongate groove 31 of the spring socket 3.

The sensor 5 is disposed above the pair of sub-detecting disks 21, 22. The sensor 5 is used to measure the proportional ratio of the no-pass and pass.

The display 6 is used to convert the rectangular wave, which is measured from the sensor 5, into the torque values. The rectangular wave is firstly calculated for its speed and time.

By this arrangement, the spring member 4 together with the inner sub-detecting disk 22 are jointly disposed within the circular recess 12 of the main disk 1 such that the upper portion of the spring member 4 is biased against with the adjusting bolt 1131 of the adjusting groove 113 of the main disk 1. As described above, the main disk 1 and the outer sub-detecting disk 21 jointly define a torque output mechanism and while the spring socket 3 and the inner sub-detecting disk 22 jointly define a torque input mechanism. Those input and output mechanisms are connected by means of a shaft 7. The sensors 5 are disposed on the top surface of those two sub-detecting disks 2. The sensors 5 are electrically connected with the display 6.

When the spring socket 3 is rotated by an external force through the shaft 7, the inner sub-detecting disk 22 will be also rotated. Originally, the teeth portion of the inner sub-detecting disk 22 and the outer sub-detecting disk 21 are aligned with each other, as in FIG. 3B, but those two detecting disks 21, 22 are not locked with each other. When the spring member 4 is rotated with a certain angle, an offset difference will be established between the teeth portion of the inner sub-detecting disk 22 and the outer sub-detecting disk 21. When the spring force of the spring member 4, that is resulted from deformation, is larger than the load, those input and output mechanisms will be rotated simultaneously. As a result, by measuring the proportional rate between the no-pass and pass of those outer and inner sub-detecting disks 21, 22, the rotational speed and torque can be readily detected. Accordingly, the rotational speed and torque can be conveniently detected in the lowest dynamic loss and smallest noise level. This overall configuration is quite simple and the overall cost is also lowered.

Figure 3C:
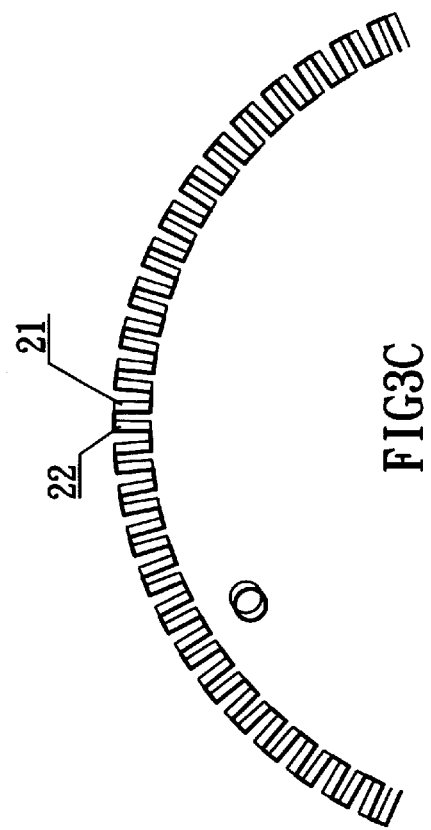
FIG. 3C is a partial view showing the detecting disks displaced.
Figure 3B:
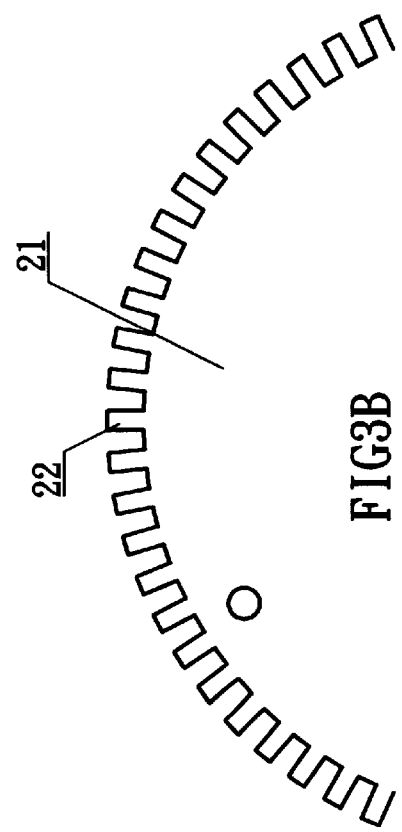
FIG. 3B is a partial view showing the detecting disks in alignment.

Referring to FIG. 3, the spring member 4 is inserted into the elongate groove 31 of the spring socket 3. The upper portion of the spring 4 is inserted into the lobe groove 13 of the main disk 1 and is further biased against with the adjusting bolt 1311 of the adjusting groove 131 of the main disk 1. The adjusting bolt 1311 can be moved upward and downward along the adjusting groove 131 to adjust the torque value. When the detecting device is rotated, the maximum of forward rotating angle of the spring element 4 is about three (3) degrees. When the spring member 4 is moved back, it is stopped by the lobe groove 13 of the main disk 1. Even the angular difference between the two sub-detecting disks 21, 22 is quite small, this variation between the outer and inner sub-detecting disks 21, 22 can be readily measured by the sensor 5 and the measurement will be further transmitted to the display 6. The measurement can be displayed by a rectangular wave and can be readily converted into the rotational speed and torque values.

Figure 4A:
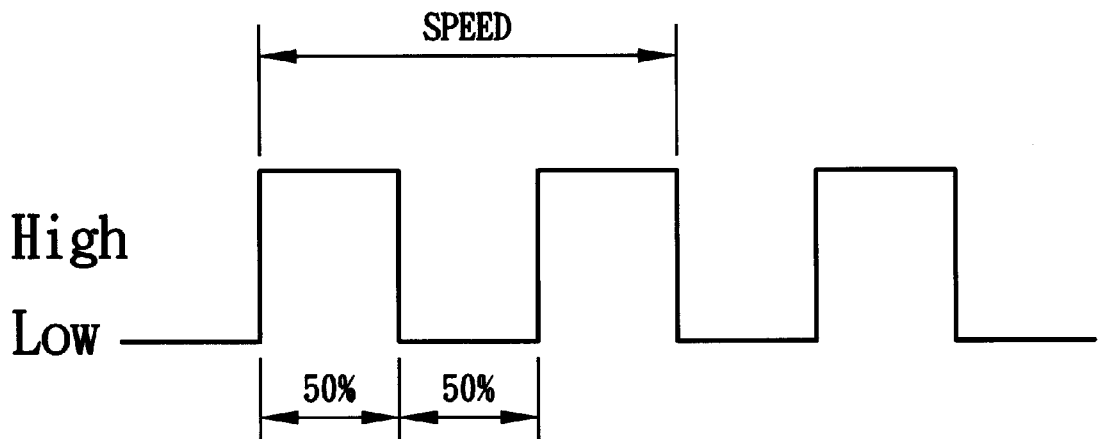
FIGS. 4A–4C are wave charts of the present invention.
Figure 4B:
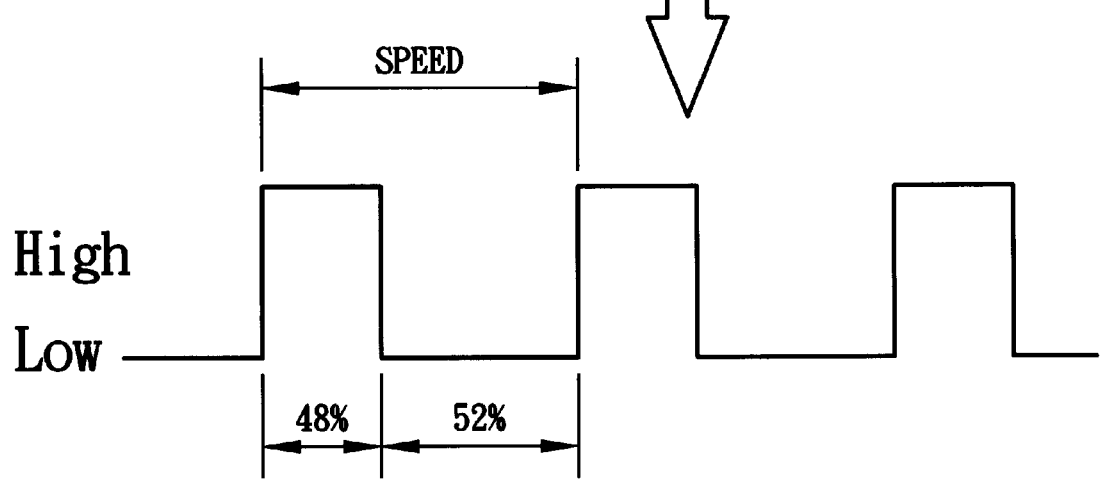
Figure 4C:
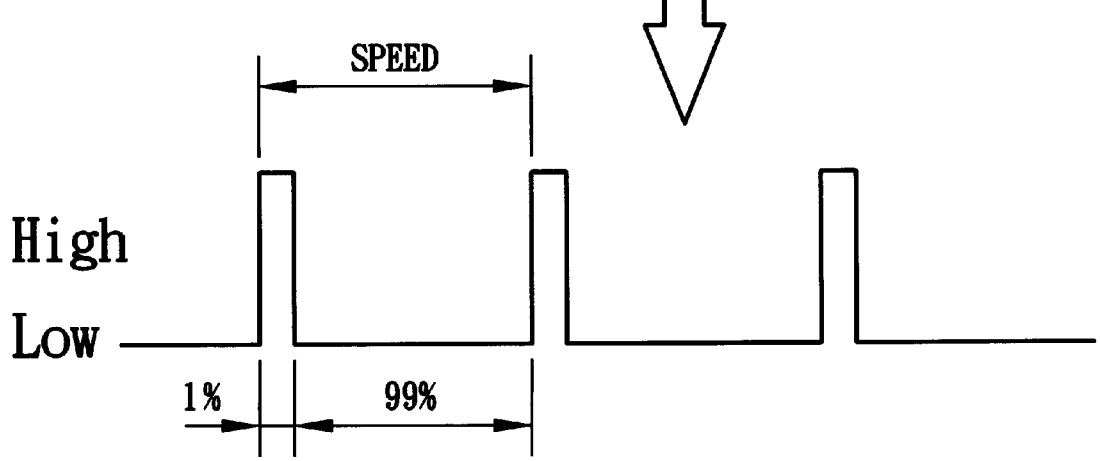

Referring to FIG. 4, the rectangular wave measured by the sensor 5 will be transmitted to the display 6 for calculating the proportional rate between the no-pass (low) and pass (high). When the outer sub-detecting disk 21 and the inner sub-detecting disk 22 are reset, i.e. the torque value is zero (0), the ratio between High/Low will be 50%:50% as in FIG. 4A. If an external force is applied to the shaft 7, i.e. a load or resistance is applied onto the input terminal, the outer sub-detecting disk 21 and the inner sub-detecting disk 22 are offset from each other again such that the ratio may become 48%:52% as in FIG. 4B. The higher the torque values, the higher the High/Low ratio. The maximum ration may reach to 1%:99% as in FIG. 4C. The ratio and the rating of the spring member can be readily used to convert the measurement into an actual torque value.

Figure 5:
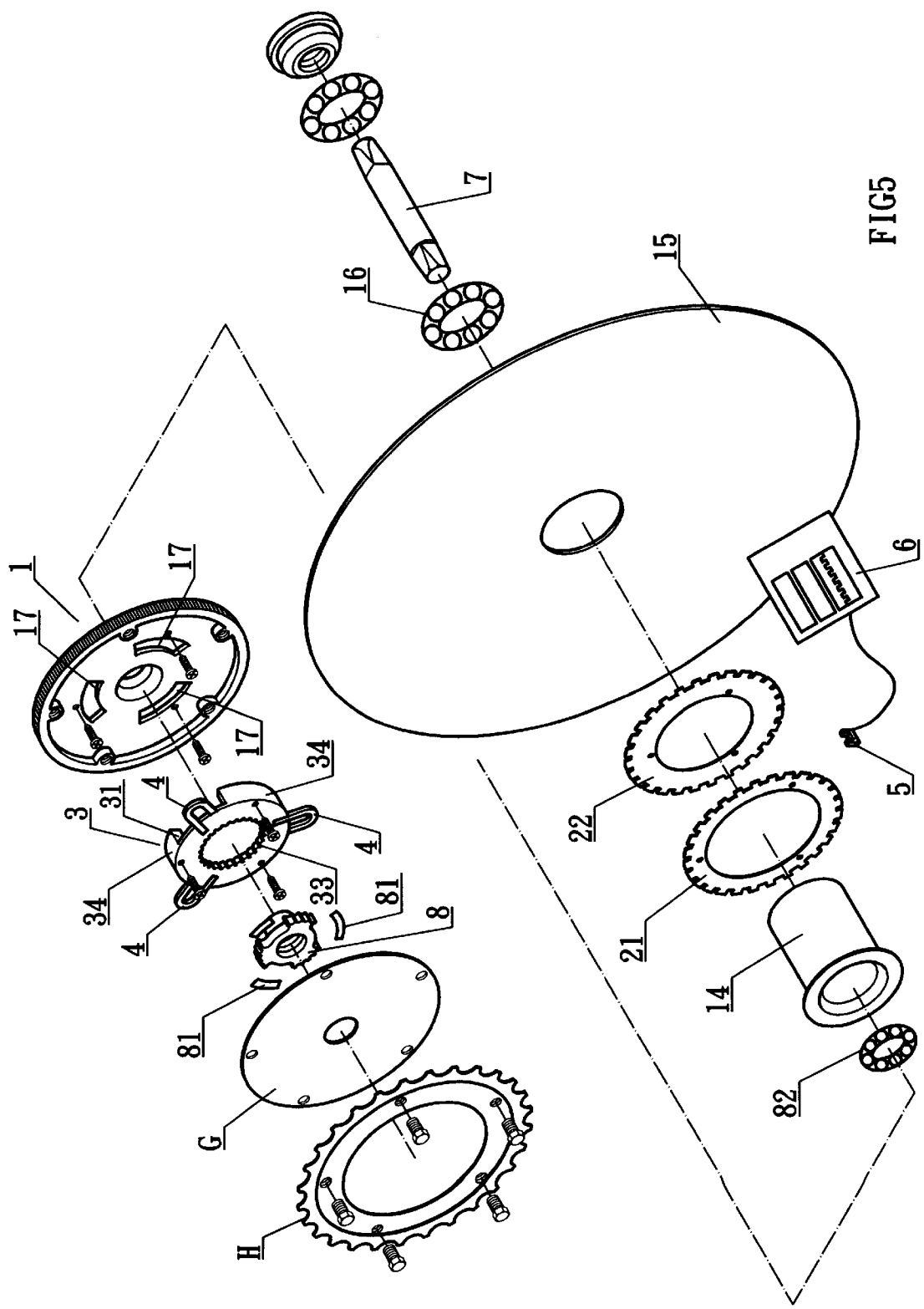
FIG. 5 is an exploded perspective view of the first embodiment of the detecting device.

Referring to FIGS. 5 and 5A, when the detecting device is applied onto the electric bicycle, a supporting bracket 14 is disposed at the rear portion of the disk 1. A protecting cover 15 is mounted onto the rear portion of the supporting bracket 14. A big bearing 16 is disposed between the main disk 1 and the supporting bracket 14. A plurality curve grooves 17 are equiangularly arranged around the shaft hole 11. A ratchet wheel socket 33 is arranged in the center of the spring socket 3. A plurality of elongate grooves 31 that are equiangularly arranged are disposed along the perimeter of the spring socket 3. The elongate groove 31 is used to receive and retain the spring member 4 therein. The back portion of the spring socket 3 is provided with a curve wedge 34 that may engaged with the curve groove 17. The wedge 34 can be readily inserted into the curve groove 17 and projects over the back portion of the main disk 1. Afterward, the outer sub-detecting disk 21 is fixedly attached to the curve tab 34 and while the inner sub-detecting disk 22 is also fixedly attached to the main disk 1 in a manner such that the outer and inner sub-detecting disks 21, 22 are aligned with each other. A ratchet wheel 8 and ratchet 81 assembly can be disposed within the spring socket 3. The ratchet wheel 8 has a plurality of T-shape cutouts in which the ratchet 81 can be releasably engaged therein. As a result, a one-way mechanism is formed. This ratchet wheel 8 is further inserted into the shaft hole 11 of the main disk 1. A small bearing 82 is disposed therebetween. Consequently, those two elements are raised upward. Then an outer cover G is enclosed thereof. A shaft 7 that has threaded portion can be inserted into for fixedly locked thereof. Then the sprocket H can be fixedly mounted for the driving chain. Finally, the modulated configuration can be fixedly disposed within the transaxle socket I of the bicycle.

In operating, the spring member 4 again serves as a force transmission medium. After the spring member 4 is moved to a certain angle, a shifting difference will be again established between the inner sub-detecting disk 22 and the outer sub-detecting disk 21. When the resilient force generated from the deformation of the spring member 4 is larger than the load, the main disk 1 will be rotated simultaneously with the spring socket 3. If the operating torque is not sufficient and detected by the sensor 5, the sensor 5 will send a signal to the display 6. Then the geared motor 9 will be triggered to generate a torque to the main disk 1 via the gear 91. Then the main disk 1 will be rotated to drive the bicycle. In this case, the ratchet 81 is disengaged from the ratchet wheel 8 such that the geared motor 9 is disengaged with the pedal. Accordingly, the potential risk therebetween can be avoided. As a result, even the pedal angle and the resulted torque may be different from time to time, the output can be regulated in a smooth manner. With the simplified configuration, the modulated configuration can be readily inserted into the transaxle socket. Not only will the assembling work can be readily done, but also will simplify the alignment. The overall configuration can be further enhanced.

Figure 6:
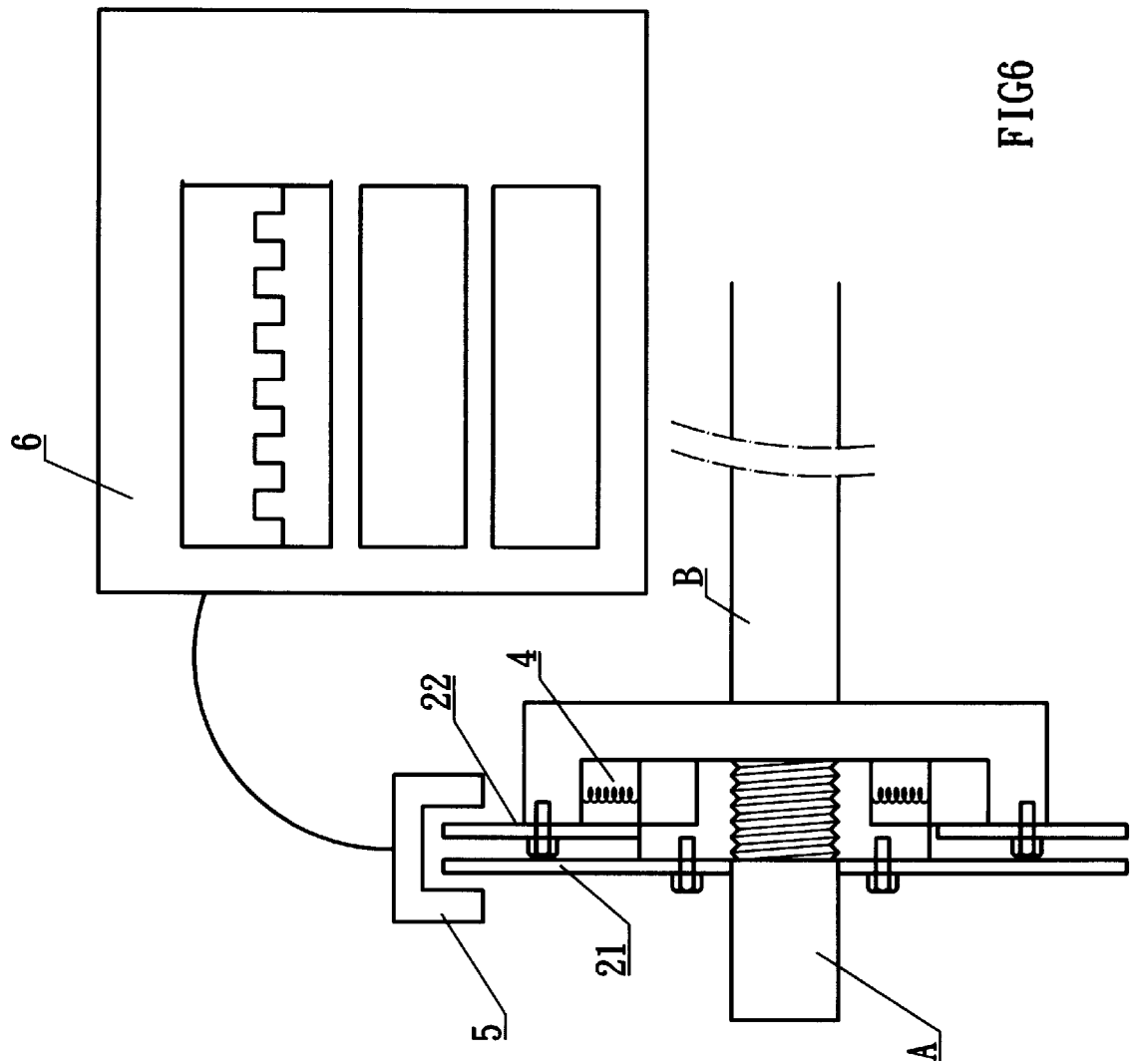
FIG. 6 is a cross sectional view of a second embodiment of the detecting device made according to the present invention.

Furthermore, the detecting device can be readily applied to any axially operated configuration. For example, as illustrated in FIG. 6, those outer and inner sub-detecting disks 21, 22 can be connected to the input shaft A and output shaft B, respectively. The sensor 5 is also disposed on those outer and inner sub-detecting disks 21, 22. The spring member 4 can be disposed between the input shaft A and the output shaft B. When the spring member 4 is moved to a certain angle such that the resilient force generated thereof is larger than the load, the output shaft B can be rotated. Accordingly, the purpose of detecting and power transmission can be readily attained. In light of this, the speed and the torque can be readily detected in a dynamic, but non-contact manner.

Figure 7:
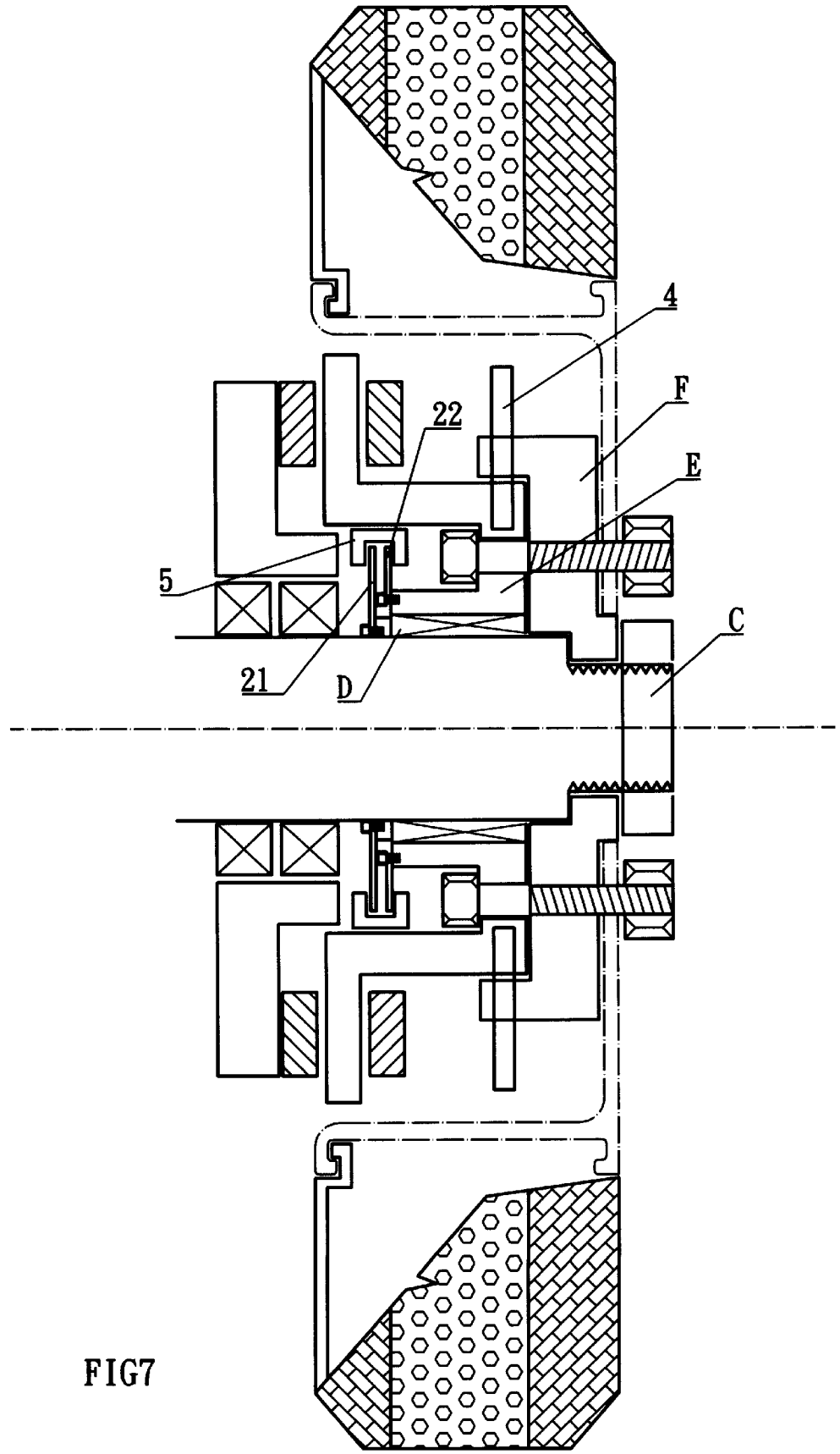
FIG. 7 is a schematic illustration showing the detecting device is applied to the braking system of a vehicle.

Referring to FIG. 7, the detecting device can serve as an Anti-Brake System and be mounted onto the hub of the vehicle. In this arrangement, the outer sub-detecting disk 21 is fixedly attached to the bearing D of the output shaft C of the engine, while the inner sub-detecting disk 22 is fixedly attached to the braking disk E that is mounted onto the bearing D. The braking disk E is provided with a groove E1 for mounting and retaining the spring member 4 thereof. The other end of the spring member 4 is biased with the wheel F and the braking disk E is mounted onto the bearing D.

When the vehicle is to stop, the braking disk E can be locked by the actuation of the braking pad of the clamp. Instantly, those outer and inner sub-detecting disks will be differentially actuated. Accordingly, the sensor 5 may detect the no-pass (low) and pass (high) and send a resulted signal to a controller. As a result, the braking torque and the rotational speed can be detected. Then a controlling signal will be sent to the controller such that those four wheels can be controlled in a balanced, stable manner. As a result, the vehicle can be stopped in a stable manner. The cost of it is considerably lower than the electronic ABS, however, the performance is equivalent. Furthermore, the overall configuration is simplified.

From the forgoing description, by the provision of the detecting device made according to the present invention, the rotational speed and the torque values can be readily detected in a dynamic, lower power loss, and noiseless manner. This has never been achieved by the existing technique.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. A detecting device capable of measuring speed and torque simultaneously, comprising a main disk, a pair of sub-detecting disks, a spring socket, a spring member, a sensor, and a display, wherein:

said main disk has a first central shaft hole, a plurality of lobe grooves located around said first central shaft hole, each of said lobe grooves being further provided with an adjusting groove in which an adjusting bolt is moveably disposed;

said pair of sub-detecting disks being comprised by an outer detecting disk and an inner detecting disk, perimeters of said outer and inner detecting disks being provided with teeth portions, and said inner detecting disk being fixedly attached to the spring socket, while said outer detecting disk is fixedly attached to said main disk;

said spring socket having a plurality of elongate grooves that are equiangularly arranged, and a second central shaft hole, each of said plurality of elongate grooves having a spring member therein such that a part of said spring member extends beyond said spring socket and is inserted into one of the plurality of lobe grooves;

said sensor being disposed adjacent said teeth portions of said pair of sub-detecting disks for measuring the proportional relative displacement between the teeth portions; and, said display being connected to said sensor to display measured torque value, wherein said spring members serve as a force transmission medium between said spring socket and said main disk, whereby when a resilient force generated from the deformation of said spring members is larger than a load applied to the spring socket, the inner and outer detecting disks will be rotated simultaneously.

2. The detecting device as recited in claim 1, wherein a rectangular wave is displayed by said display during operation of the detecting device, such that, when said pair of sub-detecting disks are subject to zero torque, a ratio is established between a high potential interval and a lower potential interval, wherein when the torque is increased, the high potential interval decreases and the lower potential interval increases, and a time proportional rate between the high potential interval and lower potential interval is changed, the sum of the high potential interval and lower potential is the rotational speed, the difference between the high potential interval and lower potential interval and measured by said sensor is an angular value of distortion of said spring members, whereby, the torque value can be readily attained by multiplying the angular value and a spring rate of said spring member, to determine the torque.

3. The detecting device as recited in claim 1, wherein said detecting device is applied to an electric bicycle and further comprising: a supporting bracket located at a rear portion of the main disk; a first bearing mounted onto a rear portion of said supporting bracket, and is disposed between said main disk and said supporting bracket; a ratchet wheel socket is arranged in the center of said spring socket; a back portion of said spring socket has a plurality of curve wedges that project from the rear portion of said main disk, such that said outer detecting disk is fixedly attached to said curve wedges; said inner detecting disk is fixedly attached to said main disk such that said outer and inner detecting disks are aligned with each other; a ratchet wheel and ratchet assembly are disposed within said spring socket engaging said ratchet wheel socket, to form, a one-way mechanism, said ratchet wheel is further inserted into said first central shaft hole of said main disk; a second bearing is disposed therebetween, whereby the assembly is fixedly disposed within a transaxle socket of the bicycle.

4. The detecting device as recited in claim 1, wherein said detecting device serves as an Anti-Brake System and is mounted onto a hub of a vehicle, and further comprises said outer detecting disk is fixedly attached to a bearing of an output shaft of an engine of the vehicle; the inner detecting disk is fixedly attached to a braking disk mounted on the bearing, such that when the braking disk is locked by the actuation of the braking system, the outer and inner detecting disks will be relatively displaced which is sensed by the sensor; and a controller connected to the sensor to control the braking torque.

* * * * *